No. 685,087. Patented Oct. 22, 1901.
F. L. BALCOMB.
RUNNING GEAR FOR AUTOMOBILES.
(Application filed Mar. 28, 1901.)
(No Model.) 2 Sheets—Sheet 2.
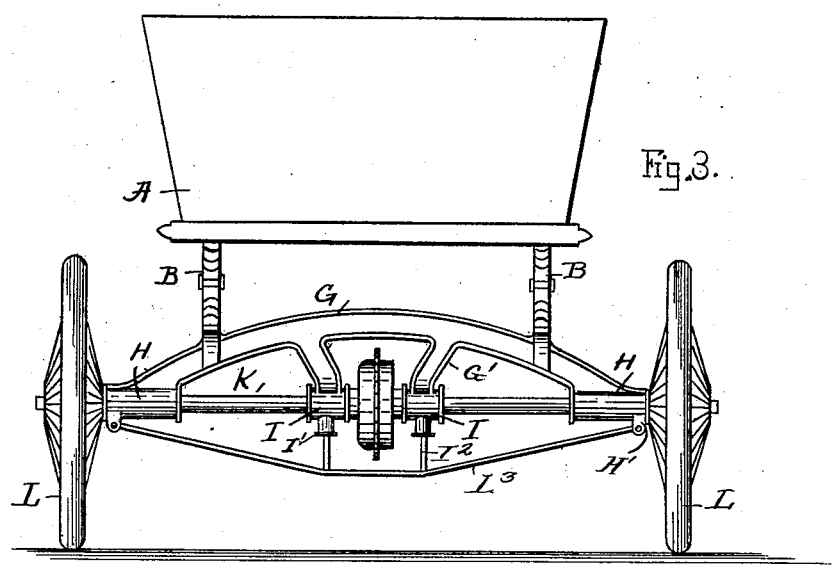
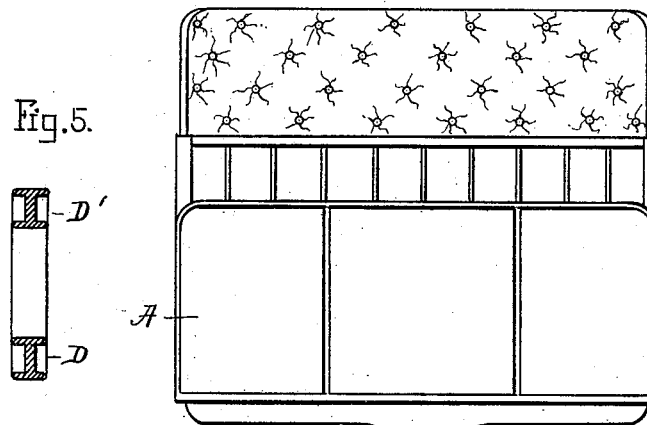
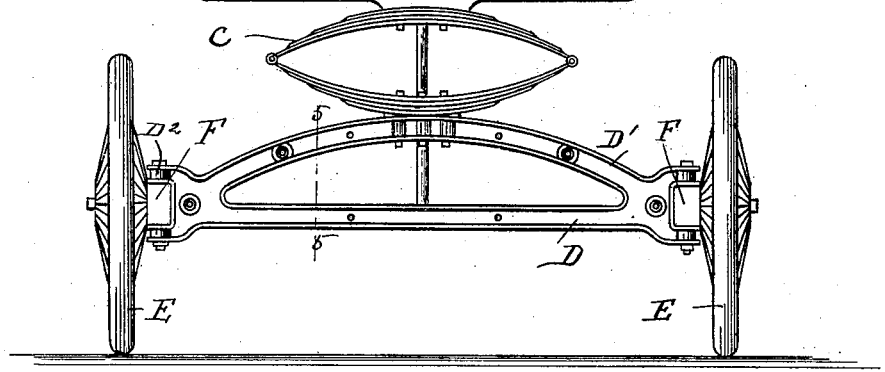
Witnesses Inventor
Lauritz N. Möller Frank L. Balcomb
Richard C. Ullrich by Alban Andrén
his atty.
THE NORRIS PETERS CO., PHOTO-LITHO., WASHINGTON, D. C.

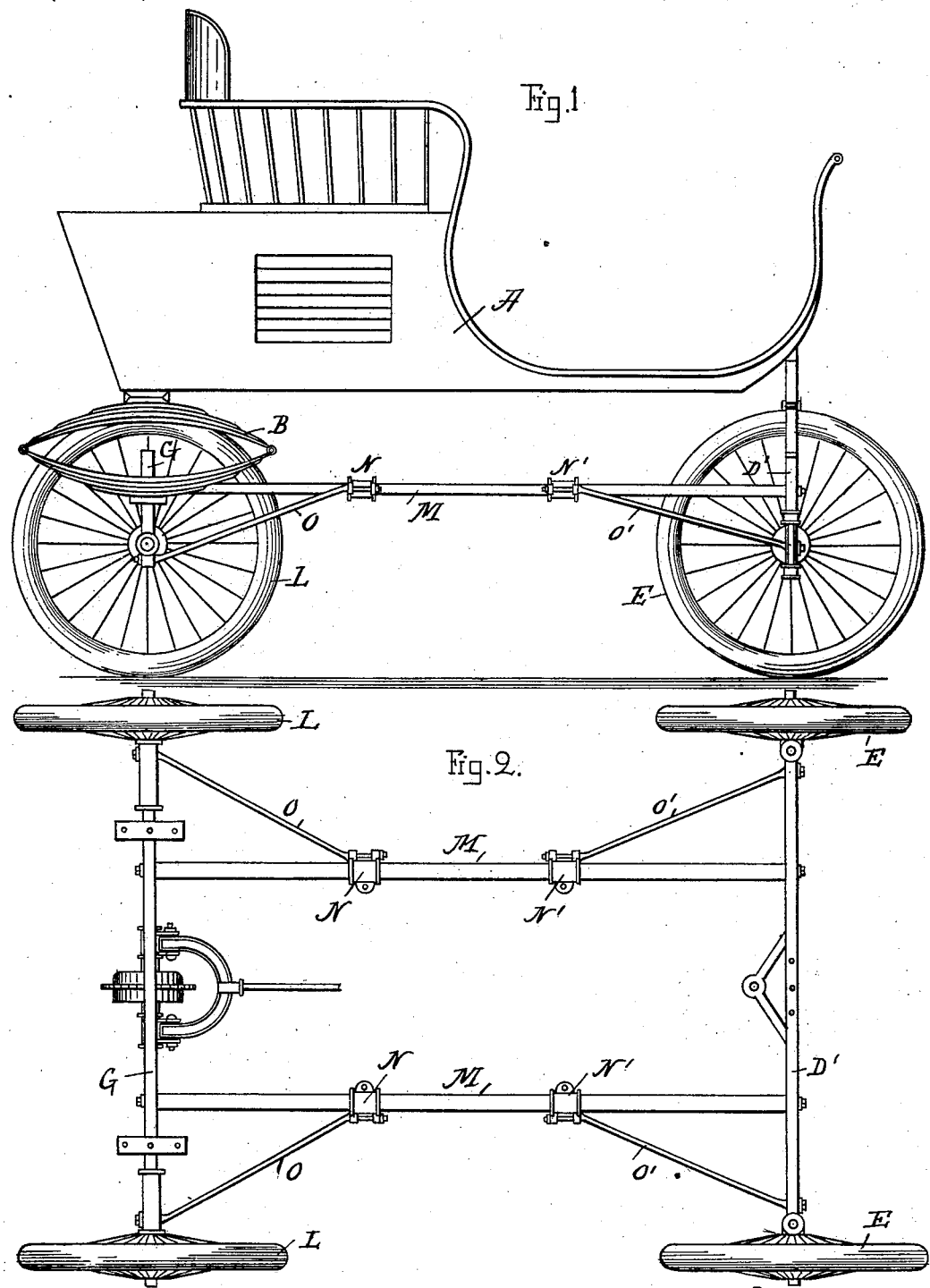

UNITED STATES PATENT OFFICE.

FRANK L. BALCOMB, OF SALEM, MASSACHUSETTS.

RUNNING-GEAR FOR AUTOMOBILES.

SPECIFICATION forming part of Letters Patent No. 685,087, dated October 22, 1901.

Application filed March 23, 1901. Serial No. 52,554. (No model.)

*To all whom it may concern:*

Be it known that I, FRANK L. BALCOMB, a citizen of the United States, residing at Salem, in the county of Essex and State of Massachusetts, have invented new and useful Improvements in Running-Gear Frames for Automobiles, of which the following is a specification.

This invention relates to improvements in running-gear frames for automobiles, and it is carried out as follows, reference being had to the accompanying drawings, wherein—

Figure 1 represents a side elevation of an automobile provided with my improved running-gear frame. Fig. 2 represents a top plan view of Fig. 1, showing the body portion removed. Fig. 3 represents a rear view of Fig. 1. Fig. 4 represents a front elevation of Fig. 1, and Fig. 5 represents an enlarged cross-section on the line 5 5, shown in Fig. 4.

Similar letters refer to similar parts wherever they occur on the different parts of the drawings.

Running-gear frames for automobiles have heretofore been made of wrought-iron tubings braced together, such frames being objectionable on account of liability to breakage at the joints where the parts are brazed together; and to prevent such danger of breakage and at the same time simplify the construction of the running-gear frame is the object of my invention, which is constructed as follows:

A, Figs. 1, 3, and 4, represents the body of the automobile, as usual having secured to the under side of its rear portion the elliptic springs B B, as usual secured to the rear running-gear frame.

To the under side of the forward portion of the automobile is secured the elliptic spring C in the ordinary manner.

The running-gear frame for the front portion of the automobile is shown in Figs. 1, 2, 4, and 5, and it is composed of a single piece of metal, preferably a casting, of iron, steel, or bronze, having a horizontal portion D and a curved truss portion D', cast or forged in one single piece, as shown in Fig. 4. In practice I prefer to make the cross-section of said part I-shaped, as shown in Fig. 5; but I do not wish to confine myself to such exact sectional shape, as it may be made T-shaped or otherwise without departing from the essence of my invention.

The front running-gear frame has its ends constructed in a bifurcated manner, and within each bifurcated end is pivotally mounted, by means of the pins $D^2$, the knuckles F, to which the front wheels E are connected.

G represents the rear running-gear frame, made of a single piece of metal, preferably a casting, of iron, steel, or bronze, and is preferably made of a sectional shape, like the front running-gear frame.

The reference-letters H H denote a pair of bearings or boxes for the rear axle K. These bearings or boxes H are formed integral with the ends of the metal frame or arch-bar G. Depending from each of the bearings or boxes H is a pair of ears H', the function of which will be hereinafter described.

The reference-letter G' denotes a pair of downwardly-extending hangers, each having at its lower end an integral bearing or box I, engaging the rear axle K approximately centrally thereof. Depending from each of the boxes or bearings I is a collar I', which are adapted to receive and retain in position the upper end of the vertical brace-rods $I^2$. The lower ends of the brace-rods $I^2$ are or may be formed integral with the truss-rod $I^3$, which has its ends secured to the ears H' of the bearings or boxes H.

M M are the perches, connected to the front and rear frames in any suitable or desirable manner. On the said perches M M are secured adjustable clamps N N, connected, by means of brace-rods O O, to the bearing portions H H of the rear frame, as shown in the drawings. N' N' are similar adjustable clamps secured to the perches M M and connected, by means of brace-rods O' O', to the front bearing-frame of the running-gear.

What I wish to secure by Letters Patent and claim is—

1. In a running-gear for vehicles, a frame for supporting the rear axle, consisting of a suitably-shaped bar, axle bearings or boxes integral with the ends of said bar, a pair of hangers integral with the said bar, and axle bearings or boxes integral with the said hangers.

2. In a running-gear for vehicles, a frame for supporting the rear axle, consisting of a suitably-shaped bar, axle bearings or boxes integral with the ends of said bar, a pair of hangers integral with the said bar, axle bearings or boxes integral with said hangers, ears integral with the end bearings or boxes, collars integral with the bearings or boxes supported by the hangers, a truss-rod having its ends secured to the said ears, and brace-rods engaging in said collars and said truss-rod.

3. In a running-gear for vehicles, a frame for supporting the rear axle, consisting of a suitably-shaped bar, axle bearings or boxes connected with the ends of said bar, a pair of hangers connected with the said bar, axle bearings or boxes connected with the said hangers, a truss-rod connected with said end bearings or boxes, and vertical brace-rods connected with said bearings or boxes supported by said hangers and with the said truss-rod.

In testimony whereof I have hereunto set my hand in presence of two subscribing witnesses.

FRANK L. BALCOMB.

Witnesses:
ALBAN ANDRÉN,
ELIZABETH A. BALCOMB.